United States Patent
Nieβner et al.

(10) Patent No.: US 8,030,393 B2
(45) Date of Patent: Oct. 4, 2011

(54) GLASS FIBER REINFORCED ABS COMPOSITIONS WITH IMPROVED STIFFNESS AND TOUGHNESS

(75) Inventors: Norbert Nieβner, Friedelsheim (DE); Kyung Ho Shon, Ulsan (KR); Ravi Ponnuswamy, Singapore (SG)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 12/593,685

(22) PCT Filed: Mar. 20, 2008

(86) PCT No.: PCT/EP2008/053393
§ 371 (c)(1),
(2), (4) Date: Sep. 29, 2009

(87) PCT Pub. No.: WO2008/119678
PCT Pub. Date: Oct. 9, 2008

(65) Prior Publication Data
US 2010/0113648 A1    May 6, 2010

(30) Foreign Application Priority Data
Mar. 29, 2007   (EP) .................................... 07105162

(51) Int. Cl.
*C08K 3/40* (2006.01)
*C08J 3/20* (2006.01)

(52) U.S. Cl. ........................................ 524/494; 523/351

(58) Field of Classification Search .................. 524/494
See application file for complete search history.

(56) References Cited

U.S. PATENT DOCUMENTS

| | | |
|---|---|---|
| 4,224,419 A | 9/1980 | Swoboda et al. |
| 4,547,533 A | 10/1985 | Zabrocki et al. |
| 4,585,824 A | 4/1986 | Uchida et al. |
| 5,039,719 A | 8/1991 | Watanabe et al. |
| 5,811,491 A * | 9/1998 | Jagawa et al. .................. 525/71 |
| 6,211,269 B1 * | 4/2001 | Pischtschan et al. ......... 524/178 |
| 6,812,283 B2 | 11/2004 | Duijzings et al. |
| 2002/0015748 A1 | 2/2002 | Miyajima et al. |
| 2002/0115748 A1* | 8/2002 | Lee et al. ...................... 523/217 |
| 2006/0094813 A1* | 5/2006 | Warth et al. .................... 524/494 |

FOREIGN PATENT DOCUMENTS

| | | |
|---|---|---|
| DE | 2826925 A1 | 1/1980 |
| DE | 3324909 A1 | 1/1985 |
| DE | 3436602 A1 | 4/1986 |
| DE | 102005040620 A1 | 4/2006 |
| DE | 102004059238 A1 | 6/2006 |
| EP | 0022200 A1 | 1/1981 |
| EP | 0303919 A2 | 2/1989 |
| EP | 0485793 A | 5/1992 |
| EP | 0518150 A2 | 12/1992 |
| JP | 56095953 A | 8/1981 |
| WO | WO-91/15543 A1 | 10/1991 |
| WO | WO 9115543 A1 * | 10/1991 |
| WO | WO-02/10222 A1 | 2/2002 |

OTHER PUBLICATIONS

W. Scholtan and H. Lange, Kolloid.-Zeitschrift and Z.-Polymere 250 (1972), pp. 782-796.
Kunststoff-Handbuch [Plastics Handbook], Vieweg-Daumiller, vol. V, (Polystyrol) [Polystyrene], Carl-Hanser-Verlag, Munich 1969, pp. 122 et seq., lines 12 et seq.
Kunststoff-Handbuch [Plastics Handbook], vol. VIII. pp. 695 et seq., Carl Hanser Verlag, Munich 1973.

* cited by examiner

*Primary Examiner* — Ling-Siu Choi
*Assistant Examiner* — Hui Chin
(74) *Attorney, Agent, or Firm* — Connolly Bove Lodge & Hutz LLP

(57) ABSTRACT

Thermoplastic moulding compositions comprising the following components: 5-95% of a copolymer A, 0-60% of a graft rubber B and 5-50% of thin glass fibers C. The copolymer A comprises 70-76% of vinylaromatic monomer(s) A1, 24-30% of vinyl cyanide monomer component(s) A2 and 0-50% of one or more unsaturated copolymerizable monomers A3. The thermoplastic moulding compositions are advantageously used for injection moulding.

18 Claims, No Drawings

GLASS FIBER REINFORCED ABS COMPOSITIONS WITH IMPROVED STIFFNESS AND TOUGHNESS

CROSS-REFERENCE TO RELATED APPLICATIONS

This application is a national stage application (under 35 U.S.C. §371) of PCT/EP2008/053393, filed Mar. 20, 2008, which claims benefit of European application 07105162.7 filed Mar. 29, 2007.

FIELD OF THE INVENTION

This invention relates to glass fiber reinforced acrylonitrile-butadiene-styrene compositions with improved stiffness and toughness.

BACKGROUND OF THE INVENTION

Thermoplastic molding compositions based on acrylonitrile-butadiene-styrene (ABS) and a process for preparation of thermoplastic ABS molding compositions are known for years. This invention relates to special glass fiber reinforced acrylonitrile-butadiene-styrene compositions, mouldings, foils, and coatings, which can be produced from thermoplastic molding compositions and glass fibers, and also to their use.

It has been known for decades that thermoplastic molding compositions can be prepared by modifying styrene-acrylonitrile copolymers via incorporation of rubbers. By way of example, this is achieved via graft copolymerization of styrene and acrylonitrile in the presence of a rubber, and also via subsequent blending of this graft copolymer with a separately prepared copolymer matrix which can, for example, be composed of a styrene-acrylonitrile copolymer or of a methylstyrene-acrylonitrile copolymer.

EP-A 0 022 200 discloses that thermoplastic molding compositions can be prepared which comprise a copolymer matrix composed of styrene and acrylonitrile, and also comprise a graft copolymer composed of a rubber latex, styrene, and acrylonitrile. Here, a polybutadiene latex is first prepared via free-radical polymerization using potassium peroxodisulfate as initiator. This rubber latex is then subjected to agglomeration, which serves to enlarge the rubber particles. This agglomeration can, for example, take place via a reaction of the rubber latex with an emulsion of a copolymer composed of ethyl acrylate and methacrylamide. The graft rubber is then prepared via reaction of the agglomerated rubber latex with styrene and acrylonitrile, using an initiator.

Glass fiber (GF) reinforced thermoplastic mixtures are also known for decades. They typically lead to an increase in rigidity and strength of the material, whereas elasticity and particularly impact strength are often significantly reduced. To achieve effective reinforcement together with a minimal loss of toughness, firm adhesion or coupling must exist between the polymer matrix and the glass fibers.

JP 56/095953 describes GF reinforced thermoplastic molding compositions containing GF-containing pellets and a GF free styrene-acrylonitrile matrix in the presence of a soluble, uncrosslinked acid containing rubber. In the process of preparation, which is difficult to control, the glass fibers are however not firmly coupled to the thermoplastic matrix.

In DE-A 33 24 909 the use of an epoxy group containing copolymer of styrene, acrylonitrile and/or methyl-methacrylate within an ABS molding composition is disclosed. Epoxy group containing copolymers however are difficult to produce in a large scale.

DE-A 34 36 602 describes GF-reinforced thermoplastic resin compounds consisting of a polymer A of styrene, acrylonitrile and methacrylates, a polymer B of styrene, acrylonitrile and maleic imides, and of polymer C containing styrene, acrylonitrile and a graft rubber D. The physical properties of the polymer mixtures show that the coupling of the glass fibers with the copolymers are inadequate.

In U.S. Pat. No. 5,039,719 the use of either maleic anhydride containing copolymers or thermoplastic polyurethanes having isocyanate groups is proposed for the use of improved coupling of glass fibers to an ABS copolymer. However, by utilizing this method, the melt flow of the resulting ABS is reduced and thus the polymer product is less suitable for injection molding.

EP-A 03 03 919 describes a glass fiber containing molding compositions of A a co-polymer of styrene and acrylnitril and B a special terpolymer of styrene, acrylonitrile and tert.-butyl (meth)acrylate, which may additionally contain a graft rubber D. The crucial monomer is tert.-butyl(meth)acrylate which decomposes at compounding temperatures above about 200° C. into (meth)acrylic acid monomer units and isobutene.

The formation of the gaseous and flammable isobutene during production however is not desirable for scaling up into an industrialized process.

U.S. Pat. No. 6,211,269 describes the utilisation of specific organic tin components to enhance the coupling reaction with GF in an ABS moulding composition. However, tin components are toxicologically adverse, especially in applications like articles for food contact, toys, cosmetic housings or medical devices.

Thus, there is the technical need to have an ABS moulding composition with improved reinforcement between the glass fibers and the copolymer, without having a negative effect on other properties such as the melt flow.

BRIEF SUMMARY OF THE INVENTION

According to the present invention it was surprisingly found that by reducing the content of vinyl cyanide monomer component(s) in the copolymer with vinylaromatic monomer(s)—the SAN matrix of the ABS composition—to an amount of 24-30% by weight, preferentially 24-28%, it is possible to improve the mechanical properties as well as the optical appearance of the resulting GF-reinforced ABS.

Therefore, the present invention relates to a thermoplastic moulding composition comprising the following components (indicated with the respective weight-percentages):

1.1 5-95% of a copolymer A consisting of:
   1.1.1 70-76% of vinylaromatic monomer(s) A1
   1.1.2 24-30% of vinyl cyanide monomer component(s) A2
   1.1.3 0-50% of one or more unsaturated copolymerizable monomers A3,
1.2 0-60% of a graft rubber B consisting of:
   1.2.1 10-95% of a graft rubber core comprising B1
      1.2.1.1 80-100% of rubber type monomers, such as butadiene, isoprene, butyl acrylate, and silicone B11
      1.2.1.2 0-20% of double unsaturated monomers such as divinylbenzene, allyl(meth)acrylate, and multi functional silicone B12

1.2.2 5-90% of a graft shell B2 comprising:
- 1.2.2.1 75-85% of vinylaromatic monomer(s) B21
- 1.2.2.2 15-25% of vinyl cyanide monomer component(s) B22
- 1.2.2.3 0-50% of one or more unsaturated copolymerizable monomers B23, 1.3 5-50% of glass fiber C.

In a preferred embodiment of the invention, a thermoplastic composition is prepared comprising (or preferably consisting of) the following components:

1.1 5-95% of a copolymer A consisting of:
- 1.1.1 72-76% of vinylaromatic monomer(s) A1
- 1.1.2 24-28% of vinyl cyanide monomer component(s) A2
- 1.1.3 0-50% of one or more unsaturated copolymerizable monomers A3, 1.2 0-60% of a graft rubber B consisting of:
- 1.2.1 10-95% of a graft rubber core B1 containing
    - 1.2.1.1 80-100% of monomers from the group of butadiene, isoprene, butyl acrylate and silicone B11
    - 1.2.1.2 0-20% of monomers from the group of divinylbenzene, allyl(meth)acrylate and multi functional silicone B12
- 1.2.2 5-90% of a graft shell B2 containing
    - 1.2.2.1 75-85% of vinylaromatic monomer(s) B21
    - 1.2.2.2 15-25% of vinyl cyanide monomer component(s) B22
    - 1.2.2.3 0-50% of one or more unsaturated copolymerizable monomers B23

1.3 5-50%, preferably 10-40%, of glass fiber C.

In a further embodiment of the invention, a thermoplastic composition is prepared containing the components A, B and C (or the components A and C) and as additional components:

D: 0.01-10, preferably 0.05-5, more preferably 0.1-2% of a copolymer containing:
- D1: 50-95% of vinylaromatic monomer(s),
- D2: 4-50% of vinyl cyanide monomer component(s), and
- D3: 1-30% of an unsaturated dicarboxylic acid anhydride, and/or E: 0-10% of a low molecular weight di-, tri- or tetra-carboxyclic acid anhydride.

In a further embodiment of the invention, a thermoplastic composition is prepared containing as an additional component:

D: 0.01-10, preferably 0.05-5, more preferably 0.1-2% of a copolymer containing:
- D1: 70-100% of alkylmethacrylate monomer(s),
- D2: 0-20% of alkylacrylate monomer(s) and
- D3: 0-10% of another copolymerizable monomer.

The invention also relates to a thermoplastic composition as described, containing as glass fiber component C glass fibers having a diameter of 10 to 25 micrometer and/or a length of 0.1 to 15 mm.

In a further embodiment of the invention, a thermoplastic composition is prepared containing as an additional functional component E at least one low molecular compound containing an epoxy-group or a maleic-anhydride or maleic imide-function.

In a further embodiment of the invention, a thermoplastic composition is prepared which comprises, as further components K, one or more components selected from the group of the dispersing agents (DA), buffer substances (BS), molecular weight regulators (MR), fillers (F), and additives (D).

The invention also relates to a thermoplastic composition, wherein the graft rubber B has from 20 to 80% by weight of rubber content.

In a further embodiment of the invention, a thermoplastic composition is prepared containing as an additional component F at least one polymer from the group comprising polycarbonates, PMMA, polyesters, polyamides, polyolefins and thermoplastic polyurethanes.

A further aspect of the invention relates to a process for the preparation of a thermoplastic composition as described, which comprises preparing the copolymer A via bulk polymerization or solution polymerization, preparing the graft rubber component B via emulsion polymerization, and then mixing the thermoplastic copolymer A and eventually the graft copolymer B with the glass fiber component C. If appropriate, the further components and/or the further thermoplastic polymers can be added.

A further embodiment of the invention relates to the use of a thermoplastic composition as described for the preparation of mouldings.

DETAILED DESCRIPTION OF THE PREFERRED EMBODIMENTS

The invention also relates to various moldings, produced from a thermoplastic composition according to description above.

As in the prior art it is generally thought that compatibility between glass fibers and matrix increases—and as result an increase in mechanical properties can be found—when the polarity of SAN matrix is high, the teaching of the present invention to reduce the vinyl cyanide percentage in the polymer matrix is surprising.

The component A according to the invention:

The thermoplastic resin that forms the copolymer A of the claimed GF-reinforced ABS composition is a copolymer. One component of this copolymer A is one or more vinylaromatic monomers from the group comprising styrene, alpha-methylstytyrene and paramethylstyrene. The preferred monomer is styrene.

The other component of copolymer A is one or more monomers from the group of vinyl cyanide monomers, such as acrylonitrile or (meth)acrylonitrile. Preferred monomer is however acrylonitrile. The copolymer A may furthermore contain one or more copolymerizable monomers, for example from the group comprising methyl(meth)acrylate, ethyl (meth)acrylate, propyl(meth)acrylate, butyl(meth)acrylate, N-phenylmaleic imide, maleic anhydride.

The copolymer A normally contains vinylaromatic components in an amount of 70-76% by weight, preferentially 72-26% by weight. The content of the vinyl cyanide monomer component is normally 24-30% by weight, preferably 24-28% by weight.

Component A might be produced by all known method, for example bulk polymerization, solution polymerization, suspension polymerization and emulsion polymerization or mixed process, e.g. mass/suspension polymerizations, with or without further components. The copolymer matrix A is preferably prepared from the components acrylonitrile and styrene and/or α-methylstyrene via bulk polymerization or in the presence of one or more solvents. Preference is given here to copolymers A whose molar masses $M_w$ are from 50 000 to 300 000 g/mol, the molar masses being capable of determination by way of example via light scattering in tetrahydrofuran (GPC with UV detection).

The copolymer matrix A can in particular comprise:

(Aa) polystyrene-acrylonitrile, prepared from, based on (Aa), from 70 to 76% by weight of styrene and from 24 to 30% by weight of acrylonitrile, or (Ab) poly-α-methylstyrene-acrylonitrile, prepared from, based on (Ab), from 70 to 76% by weight of α-methylstyrene and from 24 to 30% by weight of acrylonitrile, or (Ac) a mixture of copolymer matrix (Aa) and of copolymer matrix (Ab).

The copolymer matrix A can also be obtained via copolymerization of acrylonitrile, styrene, and α-methylstyrene. The number-average molar mass ($M_n$) of the copolymer matrix A preferably amounts to from 15 000 to 100 000 g/mol (determined by means of GPC with UV detection). The viscosity (Vz) of the copolymeric matrix A amounts by way of example to from 50 to 120 ml/g (measured to DIN 53726 at 25° C. in a 0.5% strength by weight solution in DMF). The copolymer matrix A can be prepared via bulk polymerization or solution polymerization in, for example, toluene or ethylbenzene, by a process as described by way of example in Kunststoff-Handbuch [Plastics Handbook], Vieweg-Daumiller, volume V, (Polystyrol) [Polystyrene], Carl-Hanser-Verlag, Munich 1969, pages 122 et seq.

The component B according to the invention:

The graft copolymer component B may be polymerized by emulsion, solution or suspension polymerization on the rubber graft base B1. Emulsion polymerization is however preferred. The average particle diameter may vary from 50 nm to 10.000 nm, preferred 80 nm to 3.000 nm, more preferred from 100 nm to 2000 nm.

Typically, the base rubber consists of a crosslinked polymer with glass transition temperature below 0° C., preferred below −20° C., more preferred below −40° C., in a preferred embodiment, the graft rubber base B1 consists of a butadiene polymer. This butadiene polymer can optionally be copolymerized with other monomers, for example styrene, acrylonitrile, (meth)acrylates or multifunctional monomers.

The rubber base B1 itself might be a core/shell polymer with polymer core and shell showing different monomer composition. Other preferred monomers for the rubber base B1 are n-butylacrylate or silicones, alone or together with other comonomers.

The shell B2 of graft copolymer B typically consists of monomers which copolymerize yielding a polymer with a glass transition temperature or more than +20° C., preferred more than +60° C. Preferred monomers are e.g. styrene, alpha-methylstyrene, (meth)acrylonitrile, methyl(meth)acrylate, ethylacrylate, N-phenylmaleic imide and maleic anhydride.

The graft copolymer component B often has a complex structure and is in essence composed of a graft base and a graft shell.

The graft base can by way of example be obtained via reaction of from 0 to 10% by weight of styrene and from 90 to 100% by weight of butadiene, and also from 0.01 to 5% by weight of ancillary components, the % by weight data being based on the graft base.

The graft shell can e.g. be obtained via reaction of styrene and acrylonitrile, and also from 0.01 to 5% by weight of ancillary components (% by weight, based on the graft shell), in the presence of the graft base.

The thermoplastic composition preferably comprises at least one thermoplastic graft polymer B with from 20 to 80% by weight rubber content. The molding composition can also comprise two or more different graft polymers.

For preparation of the graft polymer it is preferable to use peroxo-disulfate as an initiator, but a redox initiator system, in particular comprising an organic peroxide, and also at least one reducing agent can also by used. The organic peroxide used preferably comprises a compound selected from the group of di-tert-butyl peroxide, cumene hydroperoxide, tert-butyl hydroperoxide, and p-menthane hydroperoxide, and mixtures thereof. The reducing agent used generally comprises at least one water-soluble compound with reducing action.

In one particular embodiment of the invention, preparation of the graft copolymer B uses a redox initiator system comprising an organic peroxide selected from the group of cumene hydroperoxide, p-menthane hydroperoxide, and mixtures thereof, and also at least one reducing agent selected from the group of salts of sulfinic acid, salts of sulfurous acid, sodium dithionite, sodium sulfite, sodium hyposulfite, sodium hydrogen-sulfite, ascorbic acid, and also salts thereof, Rongalit C (sodium formaldehyde-sulfoxylate), mono- and dihydroxyacetone, sugars, ferrous salts, stannous salts, and titanium(III) salts.

It is preferable that an emulsion polymerization is carried out for preparation of the graft base (B1) and uses potassium peroxodisulfate as initiator.

Examples of suitable preparation processes for the graft copolymers B are emulsion polymerization, solution polymerization, suspension polymerization, or bulk polymerization, and the graft copolymers B here are preferably prepared via aqueous free-radical emulsion polymerization. WO-A 2002/10222, DE-A 28 26 925, and also in EP-A 022 200 inter alia describe suitable polymerization processes.

By way of example, the graft base can be prepared via free-radical-initiated aqueous emulsion polymerization, by using a portion of the monomers in an aqueous reaction medium as initial charge and adding the remaining residual amount of monomers, if appropriate, in the aqueous reaction medium after initiation of the free-radical polymerization reaction. It is also possible to use at least a portion of the free-radical polymerization initiator and, if appropriate, of further auxiliaries in the aqueous reaction medium as initial charge, to bring the resultant aqueous reaction medium to polymerization temperature, and at this temperature to add the monomers to the aqueous reaction medium. This introduction can also take the form of a mixture, for example the form of an aqueous monomer emulsion.

The reaction is initiated via water-soluble or oil-soluble free-radical polymerization initiators, e.g. inorganic or organic peroxides (for example peroxodisulfate or benzoyl peroxide), or with the aid of redox initiator systems. It is preferable that peroxodisulfate is used as initiator in preparation of the graft base. The amount of free-radical initiator used, based on the entire amount of monomer, is generally from 0.01 to 5% by weight, preferably from 0.1 to 3% by weight, and particularly preferably from 0.2 to 1.5% by weight.

The particle size distribution of the graft copolymers B can be mono-, bi-, or polymodal. According to one particularly preferred embodiment of the invention, the particle size distribution is bimodal.

The average particle sizes and particle size distributions stated are the sizes determined from the cumulative weight distribution. These and the further particle sizes stated for the purposes of the present invention are generally the weight-average particle sizes determined by means of an analytical ultracentrifuge by the method of W. Scholtan and H. Lange, Kolloid.-Zeitschrift and Z.-Polymere 250 (1972), pages 782-796.

The term graft copolymer includes a mixture of various graft rubbers. By way of example, the emulsion of one or more further graft rubbers can be added to the aqueous reaction mixture of a graft rubber. The mixture of these graft rubbers can then be isolated. It is particularly preferable to isolate a graft rubber from its reaction mixture.

The Component C according to the invention:

Glass fibers according to the invention are commercially available glass fibers, e.g. the traditional A, E, C or S-Glass fibers. Low or non-alkali containing fibers are preferred. The typical lengths are 0.1-15 mm or endless glass rovings. Typical diameters of the glass fibers are 10-100 micrometer, preferred 10-25 micrometer. Typically, these fibers contain already a size, needed to improve adhesion to the polymer matrix. Also sized fibers can be used according to the invention. The component C is often used in an amount of 5 to 50% by weight, preferably from 10 to 40% and in a particular embodiment from 20 to 35%.

The component D according to the invention:

As adhesion promoter, the polymer composition according to the invention can contain polymers with functional groups, such as epoxy, maleic anhydride or imide groups. Preferred are polymers containing maleic anhydride monomer units in an amount of 1-30% by weight.

The component E according to the invention:

Optionally, as a further component according to the invention, a low molecular weight functional component with e.g. epoxy-, maleic anhydride or maleic imide functions may be added. Typical examples are styrene-maleic anhydride copolymers, styrene-acrylonitrile-maleic anhydride copolymers, N-Phenyl maleic imide—maleic anhydride copolymers.

The components F according to the invention:

Optionally, as a further component according to the invention, further polymers or additives can be added. Polymers which might be added can be for example: polycarbonate, PMMA, polyester, polyamide, polyolefins and/or thermoplastic polyurethanes.

Suitable polycarbonates and, respectively, polyester carbonates can for example be linear or branched. Branched products are preferably obtained via incorporation of from 0.05 to 2.0 mol %, based on the entirety of the diphenols used, of compounds whose functionality is three or more, e.g. those having three or more phenolic OH groups. The polycarbonates and polyester carbonates can comprise halogen bonded to an aromatic system, preferably bromine and/or chlorine. However, they are preferably halogen-free. Their average molecular weights ($M_w$, weight-average; determined, for example, via ultracentrifuging or scattered light measurement) are from 10 000 to 200 000, preferably from 20 000 to 80 000.

Suitable thermoplastic polyesters are preferably polyalkylene terephthalates, i.e. reaction products composed of aromatic dicarboxylic acids or of their reactive derivatives (e.g. dimethyl esters or anhydrides) and of aliphatic, cycloaliphatic, or arylaliphatic diols, and mixtures of these reaction products. Preferred polyalkylene terephthalates can be prepared from terephthalic acids (or from their reactive derivatives) and from aliphatic or cycloaliphatic diols having from 2 to 10 carbon atoms, by known methods (see Kunststoff-Handbuch [Plastics Handbook], volume VIII. pp. 695 et seq., Carl Hanser Verlag, Munich 1973).

Suitable polyamides are known homopolyamides, copolyamides, and mixtures of these polyamides. These can be semicrystalline and/or amorphous polyamides. Semicrystalline polyamides that can be used are nylon-6, nylon-6,6, and mixtures, and corresponding copolymers composed of these components. It is also possible to use semicrystalline polyamides whose acid component is composed entirely or to some extent of terephthalic acid and/or isophthalic acid and/or suberic acid and/or sebacic acid and/or azelaic acid and/or adipic acid and/or cyclohexanedicarboxylic acid, and whose diamine component is composed entirely or to some extent of m- and/or p-xylylenediamine and/or hexamethylenediamine and/or 2,2,4-tri-methylhexamethylenediamine and/or 2,2,4-trimethylhexamethylenediamine and/or isophoronediamine, and whose constitution is known. Mention may also be made of polyamides which are prepared entirely or to some extent from lactams having from 7 to 12 carbon atoms in the ring, if appropriate with concomitant use of one or more of the abovementioned starting components.

Amorphous polyamides that can be used are known products which are obtained via polycondensation of diamines, such as ethylenediamine, hexamethylenediamine, decamethylenediamine, 2,2,4- and/or 2,4,4-trimethylhexamethylenediamine, m- and/or p-xylylenediamine, bis(4-aminocyclohexyl)methane, bis(4-aminocyclohexyl)propane, 3,3'-dimethyl-4,4'-diaminodicyclohexylmethane, 3-aminomethyl,3,5,5-trimethylcyclohexylamine, 2,5- and/or 2,6-bis(aminomethyl)norbornane, and/or 1,4-diaminomethylcyclohexane, with dicarboxylic acids, such as oxalic acid, adipic acid, azelaic acid, decanedicarboxylic acid, heptadecanedicarboxylic acid, 2,2,4- and/or 2,4,4-trimethyladipic acid, isophthalic acid, and terephthalic acid.

Other suitable copolymers are those obtained via polycondensation of a plurality of monomers, and also copolymers prepared using addition of aminocarboxylic acids, such as ε-aminocaproic acid, ω-aminoundecanoic acid, or ω-aminolauric acid, or lactams thereof. Particularly suitable amorphous polyamides are the polyamides prepared from isophthalic acid, and from hexamethylenediamine and from further diamines, such as 4,4'-diaminodicyclohexylmethane, isophoronediamine, 2,2,4- and/or 2,4,4-trimethylhexamethylenediamine, 2,5- and/or 2,6-bis(aminomethyl)norbornene; or from isophthalic acid, 4,4'-diaminodicyclohexylmethane, and ε-caprolactam; or from isophthalic acid, 3,3'-dimethyl-4,4'-diaminodicyclohexylmethane and laurolactam; or from terephthalic acid and from the isomer mixture composed of 2,2,4- and/or 2,4,4-trimethylhexamethylenediamine.

If use is also made of at least one polymer selected from the group of the polycarbonates, polyesters, polyester carbonates, and polyamides, its amount is up to 500 parts by weight, preferably up to 400 parts by weight, and particularly preferably up to 300 parts by weight (based in each case on 100 parts by weight of polymer matrix A+graft copolymer B).

However, it is also possible to use mixtures composed of two or more of the polymers mentioned. The inventive thermoplastic molding compositions can comprise, based on the ABS components, from 0 to 90% by weight, preferably from 0 to 50% by weight, particularly preferably from 0 to 20% by weight, of the abovementioned polymers.

Typical additives can be lubricants such as mineral oil, silicone oil, phthalates, waxes, stearates, diamines (eg stearyl bis ethylene diamine), organic or inorganic fillers such as titanium dioxide, calcium carbonate, talc, carbon, silicium dioxide, UV stabilizers such as HALS (hindered amine light stabilizers), triazines, absorbers, heat stabilizers such as hindered phenols, Vitamin E, colorants, pigments, color batches (e.g. carbon black in a polymer matrix), etc or further additives, typically used in polymers Ancillary and processing additives that can be added to the inventive ABS molding compositions comprise amounts of from 0 to 10% by weight, preferably from 0 to 5% by weight, in particular from 0 to 4% by weight, of various additives.

Additives that can be used are any of these substances which are usually used for the processing or modification of the polymers.

Examples that may be mentioned are dyes, pigments, colorants, antistatic agents, antioxidants, stabilizers for improving thermal stability, stabilizers for increasing lightfastness, stabilizers for raising resistance to hydrolysis and to chemicals, agents to counteract thermal decomposition, and in particular lubricants, these being advantageous for the production of moldings. These further additives can be metered into the material at any stage of the preparation or production process, but preferably at an early juncture, in order to utilize the stabilizing effect (or other specific effects) of the additives at an early stage. With respect to further conventional auxiliaries and additives, reference is made by way of example to "Plastics Additives Handbook", Ed. Gächter and Müller, 4th edition, Hanser Publ., Munich, 1996.

Examples of suitable pigments are titanium dioxide, phthalocyanines, ultramarine blue, iron oxides, or carbon black, and also the entire class of organic pigments.

Examples of suitable colorants are any of the dyes that can be used for the transparent, semitransparent, or nontransparent coloring of polymers, in particular those which are suitable for the coloring of styrene copolymers.

Examples of suitable flame retardants that can be used are the compounds known to the person skilled in the art and which comprise halogen or comprise phosphorus, other examples being magnesium hydroxide, and also other familiar compounds, or a mixture of these.

Examples of suitable antioxidants are sterically hindered mononuclear or polynuclear phenolic antioxidants, which can have various types of substitution and can also have bridging by way of substituents. Among these are not only monomeric but also oligomeric compounds which can be composed of a plurality of phenolic parent systems. Hydroquinones and hydroquinone-analogous, substituted compounds can also be used, as also can antioxidants based on tocopherols and on derivatives of these. It is also possible to use a mixture of various antioxidants. In principle, it is possible to use any of the commercially available compounds or compounds suitable for styrene co-polymers, e.g. Irganox. The substances known as co-stabilizers, in particular co-stabilizers comprising phosphorus or comprising sulfur, can be used concomitantly together with the phenolic antioxidants mentioned by way of example above. The person skilled in the art is aware of these co-stabilizers comprising P or comprising S.

Examples of suitable light stabilizers are various substituted resorcinols, salicylates, benzotriazoles, and benzophenones. Matting agents that can be used are not only inorganic substances, such as talc, glass beads, or metal carbonates (e.g. $MgCO_3$, $CaCO_3$), but also polymer particles—in particular spherical particles whose diameters $d_{50}$ (weight-average) are above 1 mm—based on, for example, methyl methacrylate, styrene compounds, acrylonitrile, or a mixture of these. It is also possible to use polymers which comprise copolymerized acidic and/or basic monomers.

Examples of suitable antidrip agents are polytetrafluoroethylene (Teflon) polymers and ultrahigh-molecular-weight polystyrene (molecular weight $M_w$ above 2 000 000).

The inventive molding compositions can be prepared from components A, B and C (and, if desired, from the further polymers, the fillers and also from conventional additives), by any of the known methods. It is possible that the components are blended via mixing in the melt, for example by extruding, kneading, or rolling the components together. This is carried out at temperatures in the range from e.g. 160 to 400° C., preferably from 180 to 280° C. In one preferred embodiment, component (B) is isolated to some extent or completely in advance from the aqueous dispersion obtained during the respective steps of preparation. By way of example, the graft copolymers B can take the form of moist or dry crumb/powder when mixed with pellets of the thermoplastic copolymer matrix A in an extruder.

The invention also provides the use of the compositions described for production of moldings, such as sheets or semifinished products, foils, fibers, or else foams, and also the corresponding moldings, such as sheets, semifinished products, foils, fibers, or foams. Processing can be carried out by means of the known methods of thermoplastics processing, and in particular production processes that can be used are thermo-forming, extrusion, injection molding, calendering, blow molding, compression molding, pressure sintering or other types of sintering, preference being given to injection molding.

The examples below are used for further illustration of the invention:

Example 1

General Preparation of Copolymer Matrix A

Various embodiments of copolymer matrix A can be prepared via mass or solution polymerization, e.g. in an organic solvent, such as toluene or ethylbenzene.

A process as described in general terms by way of example in Kunststoff-Handbuch [Plastics Handbook], Vieweg-Daumiller, volume V, (Polystyrol) [Polystyrene], Carl-Hanser-Verlag, Munich 1969, pages 122 et seq., lines 12 et seq. can be used as the basis for operations here. It is also possible to prepare a matrix in the form of a mixture of two (or more) matrices.

1a) In a specific example, the copolymer matrix (A-1) can be prepared with viscosity $V_Z$ of 80 ml/g, starting from 65% by weight of styrene and 35% by weight of acrylonitrile at a temperature of from 150 to 180° C. with a proportion of from 10 to 20% by weight of solvent, without use of an initiator.

1b) As an alternative, a copolymer matrix (A-2) can be prepared, with viscosity $V_Z$ of 80 ml/g, starting from 75% by weight of styrene and 25% by weight of acrylonitrile.

1c) A copolymer matrix (A-3) can be prepared, with viscosity $V_Z$ of 60 ml/g, starting from 75% by weight of styrene and 25% by weight of acrylonitrile.

1d) A copolymer matrix (A-4) can be prepared, with viscosity $V_Z$ of 60 ml/g, starting from 81% by weight of styrene and 19% by weight of acrylonitrile.

1e) A copolymer matrix (A-5) can be prepared, with viscosity $V_Z$ of 60 ml/g, starting from 67% by weight of styrene and 33% by weight of acrylonitrile.

Example 2

Preparation of Copolymer Matrix (A) with Glass Fibers (C)

A mixture of 35% by weight of glass fibers (Producer: Owens Corning, FT574, chopped type 3.0 mm length) were compounded with 65% by weight of the following polymer matrixes:

A-1: S/AN 65/35,
A-2: S/AN 75/25,
F-1: Color batch: 35% carbon black and 65% Copolymer-matrix A-2

The compounding was performed on an extruder machine (manufacturer: Berstorff ZE25 L/D=33D) at a temperature of 240° C. and 250 r.p.m. The polymer was extruded via dieplate and the water chilled polymer strands were granulated.

The granulated polymer was injection molded with a common injection molding machine (LG ID 75EN) at 240° C., 75MT clamp force, 60% injection speed, 55° C. mold temperature to a 3.2 mm thick specimen used for stress/strain test according to the norm ASTM D638 and to 3.2 mm thickness specimen according to the norm ASTM D256.

To show the properties of the compositions the following tests were performed:
Tensile strength (ASTM D-638)
Impact (ASTM D-256)
Visual evaluation (1: no GF visible, 10: very rough, matte surface appearance, ISO306).

The test methods which furthermore can be used for characterization of the thermo-plastic compositions are briefly collated below:

a) Tensile Strength and flexural modulus are determined at a temperature of 23° C. according to the ASTM D-638 method.

b) Penetration (multiaxial toughness) [Nm]:
Penetration is determined to ISO 6603-2 on plaques (60×60×2 mm, produced to ISO 294 in a family mold at a melt temperature of 240° C. and at a mold temperature of 50° C.).

c) Flowability (MVR[ml/10']):
Flowability is determined to ISO 1133 B on a polymer melt at 220° C. with a load of 10 kg.

d) Elasticity (modulus of elasticity [MPa]):
Elasticity is tested to ISO 527-2/1A/50 on test specimens (produced to ISO 294 at a melt temperature of 250° C. and at a mold temperature of 60° C.).

e) Viscosity
Viscosity number ($V_z$) is determined to DIN 53726 on a 0.5% strength solution of the polymer in DMF.

f) Visual evaluation (1: no GF visible, 10: very rough, matte surface appearance)

Example 1

The components used in the following examples are as follows:
Component A-1: S/AN 65/35 (VLP)
Component A-2: S/AN 75/25 (VL3)
Component C-1: Glass Fiber (Owens Corning FT584)
Component D-1: PMMA (LG IF 870S)
Component E-1: SAN-MA (BASF VT2421)
Component F1: Color batch: 35% carbon black and 65% S/AN 75/25

TABLE 1

|  | Example 0 | Example 1 | Example 2 |
|---|---|---|---|
| A-1 | 65 | | |
| A-2 | | 65 | 65 |
| C-1 | 35 | 35 | 35 |
| D-1 | | | |
| E-1 | | | 1 |
| F-1 | 2.4 | 2.4 | 2.4 |
| Tensile Yield | 95 | 90 | 92 |
| Visual evaluation | 10 | 8 | 7 |

|  | Example 3 | Example 4 | Example 5 |
|---|---|---|---|
| A-1 | | | |
| A-2 | 65 | 65 | 65 |
| C-1 | 35 | 35 | 35 |

TABLE 1-continued

| D-1 | | | 5 |
|---|---|---|---|
| E-1 | 2 | 5 | |
| F-1 | 2.4 | 2.4 | 2.4 |
| Tensile Yield | 95 | 100 | 93 |
| Visual evaluation | 7 | 6 | 7 |

The examples according to the invention have a better visual evaluation than the thermoplastic compositions of the prior art.

Example 2

In a second experiment, the effect of adding S/AN/MA is shown.

As base resins, commercial ABS grades (Terluran GP-22, BASF AG, Germany, and Terluran GP-35, BASF AG) were used, and mixed under compounding conditions with glass fibers, SAN components and S/AN/MA.

The component A-3 contains 25% of AN.

TABLE 2

| Test items | Example 7 | Example 8 | Example 9 | Example 10 |
|---|---|---|---|---|
| Recipe: | | | | |
| Terluran GP-22 | 80 | 40 | 40 | |
| Terluran GP-35 | | | | 80 |
| Component A3 | | 40 | 37 | |
| Component C1 | 20 | 20 | 20 | 20 |
| Component E1 | | | 3 | |
| Tensile strength, Kgf/cm² | 950 | 990 | 1040 | 810 |
| Flexural strength, Kgf/cm² | 1200 | 1380 | 1580 | 1140 |
| Flexural modulus, Kgf/Cm² | 56000 | 57300 | 56700 | 48200 |
| Izod impact, Kgf. Cm/cm | 8 | 6 | 9 | 8 |
| MVI, cc/10 min. | 4.5 | 10 | 10 | 10 |
| VST, deg. C. | 105 | 107 | 107 | 101 |
| HDT, deg. C. | 102 | NA | NA | NA |
| Density, g/cm³ | 1.18 | 1.19 | 1.19 | 1.18 |
| GF contents, % | 20 | 20 | 20 | 20 |

| Test items | Example 11 | Example 12 | Toray, GF-reinforced ABS with 20% Glass fiber |
|---|---|---|---|
| Recipe: | | | |
| Terluran GP-22 | 77 | 75 | |
| Styroflex 2G66 | 3 | 5 | |
| Styrolux 3G55 | | | |
| Component C1 | 20 | 20 | |
| Tensile strength, Kgf/cm² | 920 | 910 | 1080 |
| Flexural strength, Kgf/cm² | 1340 | 1350 | 1470 |
| Flexural modulus, Kgf/Cm² | 55900 | 56400 | 56000 |
| Izod impact, Kgf. cm/cm | 6 | 6 | 4 |
| MVI, cc/10 min. | 10 | 10 | 7 |
| VST, deg. C. | 105 | 105 | NA |
| HDT, deg. C. | NA | NA | 103 |

TABLE 2-continued

| | | | |
|---|---|---|---|
| Density, g/cm³ | 1.19 | 1.19 | 1.19 |
| GF contents, % | 20 | 20 | 20 |

Example 3

In the third experiment, the effect of the acrylonitrile content on the visual effect of a glass fiber reinforced SAN is described:

TABLE 3

| | Example 21 | Example 22 | Example 23 | Example 24 | Example 25 | Example 26 |
|---|---|---|---|---|---|---|
| A-3 | | 40 | 70 | 80 | 70 | 40 |
| A-4 | 80 | 40 | 10 | | | |
| A-5 | | | | | 10 | 40 |
| C-1 | 20 | 20 | 20 | 20 | 20 | 20 |
| Total AN content in Matrix | 19 | 22 | 24 | 25 | 26 | 29 |
| Visual Evaluation: | 10 | 9 | 7-8 | 7-8 | 7-8 | 9 |

The matrix A-3 contains 25% of AN.
The matrix A-4 contains 19% of AN.
The matrix A-5 contains 33% of AN.

As it can be seen, very good visual evaluation is observed for those glass-fiber reinforced thermoplastic compositions which have a total acrylonitrile content in the matrix of 24 to 26% by weight.

The invention claimed is:

1. A thermoplastic moulding composition comprising:
    5-95% of a copolymer (A) comprising: 70-76% of vinylaromatic monomer(s) (A1), 24-30% of vinyl cyanide monomer component(s) (A2) and 0-50% of one or more unsaturated copolymerizable monomers (A3);
    0-60% of a graft rubber (B) comprising: 10-95% of a graft rubber core (B1) and 5-90% of a graft shell (B2), wherein the graft rubber core (B1) comprises 80-100% of rubber type monomers (B11) and 0-20% of double unsaturated monomers (B12), and wherein the graft shell (B2) comprises 75-85% of vinylaromatic monomer(s) (B21), 15-25% of vinyl cyanide monomer component(s) (B22), and 0-50% of one or more unsaturated copolymerizable monomers (B23);
    5-50% of glass fiber (C); and
    0.01-10% of a copolymer (D) comprising 70-100% of alkylmethacrylate monomer(s) (D1), 0-20% of alkylacrylate monomer(s) (D2), and 0-10% of another copolymerizable monomer (D3).

2. The thermoplastic moulding composition of claim 1, wherein the rubber type monomers (B11) are one or more selected from the group consisting of butadiene, isoprene, butyl acrylate, and silicones.

3. The thermoplastic moulding composition of claim 2, wherein the double unsaturated monomers (B12) are one or more selected from the group consisting of divinylbenzene, allyl(meth)acrylate, and multi-functional silicone.

4. The thermoplastic moulding composition of claim 3, wherein the copolymer (A) comprises 72-76% of the vinylaromatic monomer(s) (A1) and 24-28% of the vinyl cyanide monomer component(s) (A2).

5. The thermoplastic moulding composition of claim 1, further comprising 0-10% of a low molecular weight di-, tri- or tetra-carboxyclic acid anhydride.

6. The thermoplastic moulding composition of claim 1, wherein the glass fiber component (C) comprises glass fibers having a diameter of 10 to 25 micrometer and a length of 0.1 to 15 mm.

7. The thermoplastic moulding composition of claim 3, further comprising an additional functional component (E) of at least one low molecular compound containing one or more of an epoxy group or a maleic-anhydride or maleic imide-function.

8. The thermoplastic moulding composition of claim 3, further comprising one or more further components selected from the group consisting of: dispersing agents, buffer substances, molecular weight regulators, fillers, and additives.

9. The thermoplastic moulding composition of claim 3, wherein the graft rubber (B) has from about 20 to about 80% by weight rubber content.

10. The thermoplastic moulding composition of claim 3, further comprising one or more additional polymer components (F) selected from the group consisting of polycarbonates, PMMA, polyesters, polyamides, polyolefins and thermoplastic polyurethanes.

11. A process for preparing the thermoplastic moulding composition comprising:
    mixing a copolymer (A) and a glass fiber component (C), wherein the copolymer (A) comprises 70-76% of vinylaromatic monomer(s) (A1), 24-30% of vinyl cyanide monomer component(s) (A2) and 0-50% of one or more unsaturated copolymerizable monomers (A3); and
    mixing in a copolymer (D) comprising 70-100% of alkylmethacrylate monomer(s) (D1), 0-20% of alkylacrylate monomer(s) (D2), and 0-10% of another copolymerizable monomer (D3) to the mixture of the thermoplastic copolymer (A) and the glass fiber component (C).

12. A process for preparing the thermoplastic moulding composition comprising:
    mixing a copolymer (A) and a glass fiber component (C) wherein the copolymer (A) comprises 70-76% of vinylaromatic monomer(s) (A1), 24-30% of vinyl cyanide monomer component(s) (A2) and 0-50% of one or more unsaturated copolymerable monomers (A3); and
    mixing in a graft rubber component (B) and a copolymer (D) to the mixture of the copolymer (A) and the glass fiber component (C),
    wherein the graft rubber component (B) comprises 10-95% of a graft rubber core (B1) and 5-90% of a graft shell (B2), wherein the graft rubber core (B1) comprises 80-100% of rubber type monomers (B11) and 0-20% of double unsaturated monomers (B12), and wherein the graft shell (B2) comprises 75-85% of vinylaromatic monomer(s) (B21), 15-25% of vinyl cyanide monomer component(s) (B22), and 0-50% of one or more unsaturated copolymerizable monomers (B23); and
    wherein the copolymer (D) comprises 70-100% of alkylmethacrylate monomer(s) (D1), 0-20% of alkylacrylate monomer(s) (D2), and 0-10% of another copolymerizable monomer (D3).

13. The process of claim 11, further comprising preparing the copolymer (A) via bulk polymerization, solution polymerization or emulsion polymerization before mixing copolymer (A) and the glass fiber component (C).

14. The process of claim 11, further comprising mixing in a graft rubber component (B) to the mixture of the thermoplastic copolymer (A) and the glass fiber component (C).

15. The process of claim 14, wherein the graft rubber component (B) comprises 10-95% of a graft rubber core (B1) and 5-90% of a graft shell (B2), wherein the graft rubber core (B1) comprises 80-100% of rubber type monomers (B11) and 0-20% of double unsaturated monomers (B12), and wherein the graft shell (B2) comprises 75-85% of vinylaromatic monomer(s) (B21), 15-25% of vinyl cyanide monomer component(s) (B22), and 0-50% of one or more unsaturated copolymerizable monomers (B23).

16. The process of claim 14, further comprising preparing a graft rubber component (B) via emulsion polymerization before mixing in the graft rubber component (B) to the mixture of the copolymer (A) and the glass fiber component (C).

17. The process of claim 12, wherein the copolymer (A) is prepared via bulk polymerization, solution polymerization or emulsion polymerization.

18. The process of claim 12, wherein the graft rubber component (B) is prepared via emulsion polymerization.

* * * * *